US007292678B2

(12) United States Patent
Glynn et al.

(10) Patent No.: US 7,292,678 B2
(45) Date of Patent: Nov. 6, 2007

(54) VOICE ACTIVATED, VOICE RESPONSIVE PRODUCT LOCATOR SYSTEM, INCLUDING PRODUCT LOCATION METHOD UTILIZING PRODUCT BAR CODE AND AISLE-SITUATED, AISLE-IDENTIFYING BAR CODE

(75) Inventors: Kenneth P. Glynn, Township of Raritan, County of Hunterdon, NJ (US); Jerome R. Mahoney, Township of Colts Neck, County of Monmouth, NJ (US)

(73) Assignee: Lamson Holdings LLC, Las Vegas, NV (US)

( * ) Notice: Subject to any disclaimer, the term of this patent is extended or adjusted under 35 U.S.C. 154(b) by 80 days.

(21) Appl. No.: 10/696,660

(22) Filed: Oct. 29, 2003

(65) Prior Publication Data
US 2004/0228456 A1   Nov. 18, 2004

Related U.S. Application Data

(63) Continuation-in-part of application No. 09/653,658, filed on Aug. 31, 2000, now Pat. No. 6,813,341.

(51) Int. Cl.
*H04M 1/64* (2006.01)
(52) U.S. Cl. .................... 379/88.04; 704/246
(58) Field of Classification Search .............. 705/22, 705/24, 26, 28, 29; 235/375–378, 383, 379, 235/385, 435, 436; 340/571, 572.1, 572.4; 707/104.1, 3, 10; 704/246, 251, 272, 254; 379/88.01, 88.04; 345/698
See application file for complete search history.

(56) References Cited

U.S. PATENT DOCUMENTS

| 5,111,501 A | 5/1992 | Shimanuki | 379/355 |
| 5,136,634 A | 8/1992 | Rae et al. | 379/100 |
| 5,165,095 A | 11/1992 | Borcherding | 379/88 |
| 5,168,548 A | 12/1992 | Kaufman et al. | 395/2 |
| 5,222,121 A | 6/1993 | Shimada | 379/88 |

(Continued)

FOREIGN PATENT DOCUMENTS

JP   356060959   * 5/1981

OTHER PUBLICATIONS

Pending U.S. non-provisional application entitled "Voice activated/voice responsive item locator," filed Nov. 2, 2006 as application No. 11/592,316 (reissue of U.S. 6,813,341).

*Primary Examiner*—Gerald Gauthier
(74) *Attorney, Agent, or Firm*—Greenberg Traurig, LLP; Bruce T. Neel

(57) ABSTRACT

The present invention is an item location system which relies upon voice activation and responsiveness to identify location(s) of item(s) sought by a user. The system includes a continuous speech recognition digital signal processor, a programmable microprocessor interfaced therewith, voice input and user feedback mechanisms, including audio and/or video feedback. Preferred embodiments utilize audio feedback to the user. The system also includes sufficient software and equipment to create item-identification/corresponding location-identification data pairs by utilizing item identifying bar codes on the items and matching them to location identifying bar codes physically situated on the corresponding locations. The continuous speech recognition engine utilizes Hidden Markov Models to create real time continuous speech recognition and feedback.

50 Claims, 4 Drawing Sheets

U.S. PATENT DOCUMENTS

| | | |
|---|---|---|
| 5,231,670 A | 7/1993 | Goldhor et al. .............. 381/43 |
| 5,239,586 A | 8/1993 | Marui ....................... 381/47 |
| 5,301,227 A | 4/1994 | Kamei et al. ................ 379/88 |
| 5,335,276 A | 8/1994 | Thompson et al. ............ 380/21 |
| 5,349,636 A | 9/1994 | Irribarren .................. 379/89 |
| 5,406,618 A | 4/1995 | Knuth et al. ................ 379/67 |
| 5,602,963 A | 2/1997 | Bissonnette et al. ........ 395/2.84 |
| 5,621,658 A | 4/1997 | Jackson et al. ............. 364/514 |
| 5,631,745 A | 5/1997 | Wong et al. ................ 350/434 |
| 5,671,328 A | 9/1997 | Fitzpatrick et al. ........ 395/2.55 |
| 5,786,764 A * | 7/1998 | Engellenner ............. 340/572.4 |
| 5,832,063 A | 11/1998 | Vysotsky et al. |
| 5,850,627 A | 12/1998 | Gould et al. ................ 704/231 |
| 5,930,336 A | 7/1999 | Junqua et al. |
| 6,092,045 A * | 7/2000 | Stubley et al. .............. 704/254 |
| 6,236,715 B1 | 5/2001 | Wong |
| 6,260,012 B1 | 7/2001 | Park |
| 6,462,616 B1 | 10/2002 | Beswick et al. |
| 6,604,681 B1 * | 8/2003 | Burke et al. ................ 235/383 |
| 6,813,341 B1 | 11/2004 | Mahoney |
| 7,136,465 B2 | 11/2006 | Glynn |
| 7,146,243 B2 | 12/2006 | Glynn et al. |
| 2002/0149609 A1 * | 10/2002 | Suzuki et al. ............... 345/698 |
| 2005/0092833 A1 | 5/2005 | Glynn |

* cited by examiner

VOICE ACTIVATED, VOICE RESPONSIVE PRODUCT LOCATOR SYSTEM, INCLUDING PRODUCT LOCATION METHOD UTILIZING PRODUCT BAR CODE AND AISLE-SITUATED, AISLE-IDENTIFYING BAR CODE

REFERENCES TO RELATED APPLICATIONS

This patent application is a continuation-in-part of U.S. patent application Ser. No. 09/653,658 filed on Aug. 31, 2000 now U.S. Pat. No. 6,813,341 and entitled "Voice Activated/Voice Responsive Item Locator", assigned to the same assignee as designated herein and having Jerome R. Mahoney as a common inventor.

BACKGROUND OF THE INVENTION

1. Field of the Invention

The present invention relates to voice activated/voice responsive item locators, i.e. item directories, which direct a user such as a consumer or shopper, to a specific location to view, retrieve, order, purchase or otherwise use the information obtained in the system. Further, the present invention includes within the aforesaid system, a method of collecting location data for the system which involves the use of product bar codes and location-situated, location-identifying bar codes. These are read and matched and stored in the main processor of the system to provide location information to subsequent users. Typically, the present invention could be used at retail stores to locate items to be purchased. Alternatively, it could be used at a production facility or distribution facility having a large number of parts, to locate specific parts for as needed. In other embodiments, it could be used in non-commercial entities, such as public libraries to locate a particular book. The locator of the present invention relies upon a specific software module to accomplish voice recognition and response, and includes manager programming for customization, updates and modifications.

2. Information Disclosure Statement

The state of the art for acquiring product location information involves the use of manually collected, inputted data. Bar codes have been used for years to identify products, but not to identify locations.

The following prior art patents represent various inventions relating to machines involving speech recognition for voice-based operation and thus illustrate known voice recognition applications:

U.S. Pat. No. 5,111,501 to Masanobu Shimanuki describes a telephone terminal device equipped with a transmitter microphone, a receiver, a speech recognition unit that receives and recognizes speech signals from the transmitter microphone and a circuit to reduce the level of signals send from a telephone network to the receiver when the speech recognition unit receives speech signals from the transmitter microphone. Further, this device is preferably equipped with a speech reproduction unit that reproduces the speech information stored in a memory, in response to the information of recognition result from the speech recognition unit, and a circuit that prevents transmission of signals from the telephone network to the receiver when the regenerated speech information is sent to the receiver. Furthermore, it is desirable for this device to be provided with a circuit that prevents generation of ringing tones when an incoming call arrives.

U.S. Pat. No. 5,136,634 to David C. Rae et al. describes voice operated facsimile machine network which includes a method and apparatus for transmitting specifically requested graphic and/or textual data from an unattended database stored in a memory, in response to the information of recognition result from the speech recognition unit, and a circuit that prevents transmission of signals from the telephone network to the receiver when the regenerated speech information is sent to the receiver. Furthermore, it is desirable for this device to be provided with a circuit that prevents generation of ringing tones when an incoming call arrives.

U.S. Pat. No. 5,136,634 to David C. Rae et al. describes voice operated facsimile machine network which includes a method and apparatus for transmitting specifically requested graphic and/or textual data from an unattended database storage location to a requestor's facsimile machine over a telephone line which includes a host computer such as a PC modified with a facsimile transmission board and a voice generation board. The host computer receives incoming phone calls and prompts the caller using the voice board to select data files by using the DTMF keys of a standard telephone handset. The PC can be left unattended and can run automatically in the facsimile transmission mode. Callers can immediately access needed textual and image data with the use of just a standard telephone and facsimile machine. Multiple workstation nodes can be configured in a network setup to handle a high volume of calls in real time and to allow multiple data services to operate simultaneously.

U.S. Pat. No. 5,165,095 to Mark A. Borcherding describes a method for dialing a telephone, using voice recognition to initiate the dialing and to determine the correct telephone number. The dialing is initiated with a spoken dial command that is recognized by using speaker independent templates that are stored locally with respect to the caller's telephone. The correct telephone number is recognized by using speaker dependent template that are downloaded from a central database or by using speaker independent templates stored locally.

U.S. Pat. No. 5,168,548 to Steven Kaufman et al. describes a reporting system which is disclosed herein, a speech recognizer which is used to select selections of text from a report telephone mounted on a vehicle or similar mobile body and which allows a call to be originated with ease. When the user of the telephone enters a voice command on voice inputting section, the dialing unit originates a call automatically and thereby connects the other party to the telephone line. In a call origination procedure, the operations for call origination and the verifications are performed between the user and the unit in an interactive sequence. In a preferred embodiment, the unit has a particular call origination procedure in which, when the other party recognized by the unit is wrong as determined by the user by verification, lower place candidates for the other party are called up in response to a particular voice command. In an alternative embodiment, the unit indicates the other party by voicing a name for verification purpose. The alternative embodiment selects and stores only the name of the other party in response to an entered voice signal and, in the event of response for verification, combines the name having been stored and response information stored beforehand to produce composite response voice.

U.S. Pat. No. 5,231,670 to Richard S. Goldhor et al. describes a system and method for generating text from a voice input that divides the processing of each speech event into a dictation event and a text event. Each dictation event handles the processing of data relating to the input into the system, and each text event deals with the generation of text from the inputted voice signals. In order to easily distinguish the dictation events from each other and text events from each other the system and method creates a data structure for storing certain information relating to each individual event. Such data structures enable the system and method to process both simple spoken words as well as spoken commands and to provide the necessary text generation in response to the spoken words or to execute an appropriate function in response to a command. Speech recognition includes the ability to distinguish between dictation text and commands.

U.S. Pat. No. 5,239,586 to Kuniyoshi Marui describes a voice recognition system which comprises a handset and a hands-free microphone for generating an input audio signal, a high-pass filter for eliminating low frequency components from the signal from the handset or hands-free microphone, a signal lever controller for adjusting the level of the high-pass signal in response to the user of either the handset or hands-free microphone, a storer for storing the speech data and a controller for controlling the storer so that a user's utterance is stored or the user's utterance is recognized by comparing the utterance to speech data already stored. The handset hook switch provides an on-hook control signal to reduce amplifier gain during hands-free microphone operation.

U.S. Pat. No. 5,301,227 to Shoichi Kamei et al. describes an automatic dial telephone that is useable in a motor vehicle, when a voice input is provided during a period in which input of the names of called parties is awaited, a voice pattern of the name of the called party is compared with reference patterns of called parties stored in reference patterns storing device, to determine the degree of the similarity therebetween. The names of the called parties are output to a user in the order of decreasing degree of similarity. Each time the name of a called party is output, a command word for confirmation is a waited from a user for a predetermined time period. When a voice confirmation command is input and is recognized during this waiting period, a telephone number corresponding to the name of the called party is supplied to a channel. Consequently, the command word for confirmation may be input only if the name of the called party outputted is one desired by the user. Sensors continually monitor the driving condition of the motor vehicle in which the telephone is installed. When the operation of the steering wheel or brakes of the motor vehicle exceeds a predetermined threshold or the speed of the motor vehicle is excessive, the sensors generate safety signals that inhibit the operation of the telephone.

U.S. Pat. No. 5,335,276 to E. Earle Thompson et al. describes a communication system which is provided with multiple purpose personal communication devices. Each communication device includes a touch-sensitive visual display to communicate text and graphic information to and from the user and for operating the communication device. Voice activation and voice control capabilities are included within communication devices to perform the same functions as the touch-sensitive visual display. The communication device includes a built-in modem, audio input and output, telephone jacks and wireless communication. A plurality of application modules are used with personal communication devices to perform a wide variety of communication functions such as information retrievable, on-line data base services, electronic and voice mail. Communication devices and application modules cooperate to allow integrating multiple functions such as real time communication, information storage and processing, specialized information services, and remote control of other equipment into an intuitively user friendly apparatus. The system includes both desktop and hand-held communication devices with the same full range of communication capabilities provided in each type of communication device.

U.S. Pat. No. 5,349,636 to Roberto Irribarren describes a communication system for verbal telephonic communication which has a voice message system for storing and retrieving voice messages integrated with a computer database accessing system for storing and retrieving text messages from a separate computer system and for converting the text messages into voice. The systems are integrated via a network which coordinates the functions of each individual system. Additionally, the input/output ports of the voice message system and the computer database accessing system are connected in a parallel fashion to at least one telephone line. In this configuration a user may access both voice messages and database information, including text or electronic mail messages, with a single telephone call. Optionally, facsimile messages can be stored, retrieved and manipulated with a single telephone call.

U.S. Pat. No. 5,406,618 to Stephen B. Knuth et al. describes a telephone answering device that is activated by a proximity sensor when a user crosses its field of detection and whose operation is controlled by simple voice commands. The device incorporates speaker-independent voice recognition circuitry to respond to spoken commands of the user that are elicited by a system generated voice request menu. The telephone answering device performs all the basic functions of a telephone answering machine in response to these simple commands and there is no need for the user to manually operate the telephone answering device.

U.S. Pat. No. 5,602,963 to W. Michael Bissonnette et al. describes a small, portable, hand-held electronic personal organizer which performs voice recognition on words spoken by a user to input data into the organizer and records voice messages from the user. The spoken words and the voice messages are input via a microphone. The voice messages are compressed before being converted into digital signals for storage. The stored digital voice messages are reconverted into analog signals and then expanded for reproduction using a speaker. The organizer is capable of a number of different functions, including voice training, memo record, reminder, manual reminder, timer setting, message review, waiting message, calendar, phone group select, number retrieval, add phone number, security and "no" logic. During such-various functions, data is principally entered by voice and occasionally through use of a limited keypad, and voice recordings are made and played back as appropriate. A visual display provides feedback to the user. During the various function, the user can edit various different data within the organizer by eliminating or correcting such data or entering new data.

U.S. Pat. No. 5,621,658 to Brion K. Jackson describes an action contained within an electronic mail object which is communicated from a data processing system to another data processing system via an audio device. The action is executable on a data processing system. At the sending data processing system, the action is converted to a predetermined audio pattern. The electronic mail object may contain text in addition to an action. The text is also converted to an audio pattern. The audio patterns are then communicated to the audio device over telephone lines or other communication medium. At the receiving end, the audio device records the object. A user can provide the recorded object to a data processing system, which then executes the action and converts the text audio patterns back to text. In addition, the action can be converted to text and displayed on the data processing system.

U.S. Pat. No. 5,631,745 to John J. Wong et al. describes a telephone terminal adapted for business or home use that includes the ability to receive and send facsimiles, a voice answering function and a computer modem. Various input and output devices may be used for the facsimile function. A voice annotated facsimile may be sent and received. At the same time the facsimile is viewed on a video monitor or ordinary television set, an accompanying voice message is heard through the sound system of the monitor or television set. The terminal has an architecture including a central processor and an internal bus structure to which several types of memory, various input-output devices and an interface with the telephone line are connected, among others. Audio Random Access Memory (ARAM) is used for storing both facsimile data and voice data.

U.S. Pat. No. 5,671,328 to Gregory P. Fitzpatrick et al. describes a method and data processing system which are disclosed for automatically creating voice processing template entries. In one embodiment, the invention automatically assembles a plurality of commands received by the data processing system, at least one of said commands having a voice recognition criteria component associated therewith, counts the occurrences of the plurality of commands, assembles voice recognition criteria components associated with the plurality of commands, and, as a result of the occurrence count exceeding a predefined minimum, constructs a voice recognition template entry by associating the assembled voice recognition criteria components with the assembled plurality of commands.

U.S. Pat. No. 5,850,627 to Joel M. Gould et al. describes a word recognition system which can: respond to the input of a character string from a user by limiting the words it will recognize to words having a related, but not necessarily the same, string; score signals generated after a user has been prompted to generate a given word against words other than the prompted word to determine if the signal should be used to train the prompted word; vary the number of signals a user is prompted to generate to train a given word as a function of how well the training signals score against each other or prior models for the prompted word; create a new acoustic model of a phrase by concatenating prior acoustic models of the words in the phrase; obtain information from another program running on the same computer, such as its commands or the context of text being entered into it, and use that information to vary which words it can recognize; determine which program unit, such as an application program or dialog box, currently has input focus on its computer and create a vocabulary state associated with that program unit into which vocabulary words which will be made active when that program group has the focus can be put; detect the available computational resources and alter the instructions it executes in response; test if its ability to respond to voice input has been shut off without user confirmation, and, if so, turn that ability back on and prompt the user to confirm if that ability is to be turned off; store both a first and a second set of models for individual vocabulary words and enable a user to selectively cause the recognizer to disregard the second set of models for a selected word; and/or score a signal representing a given word against models for that word from different word model sets to select which model should be used for future recognition.

Notwithstanding the prior art, the present invention is neither taught nor rendered obvious thereby.

SUMMARY OF THE INVENTION

A voice activated/voice responsive item locator system is disclosed to enable a user to speak into the system and have the system respond with location information for an item requested by the user. For example, shopper at a home supply store may pick up a locator phone or just speak into a wall mounted or otherwise situated microphone and say "Locate Outdoor Paint" or "Find Hammers" or simply state what is sought without the use of a verb, e.g. "Caulking". The system may reply either with voice or visual (words on a screen, or map), or both voice and visual, e.g. "Aisle 3, Shelf 4". In some instances the system will reply, for example, with a "Repeat", or "Restate in different words" or "Please talk to information desk" or other default instructions.

The present invention also includes a method of creating data for locating items so that the system is efficiently loaded with location data both prior to use by the customers or other users, as well as so that the system may be updated as desired while it is in use. This method involves utilization of bar codes to determine item identity, and the use of separate bar codes to determine locations. These separate bar codes are physically located on location structure, e.g. on aisle ends, shelf edges, bin walls, parking spaces, etc. This location data is read in conjunction with item identification data by bar code readers, fed to a processor in a recognizable combined format, and then stored and used as the resource data of the locator system.

For example, a supermarket could assign unique bar codes to each aisle, create bar code labels and attach them to the ends of each aisle, and then program the system according to the following simple process:

a) The processor will be programmed to read and identify products by the universal price code ("UPC") inputs form a bar code reader, and will likewise be programmed to recognize and identify locations by bar code inputs from a bar code reader, that is, the processor will be programmed to understand the codes created for particular locations to be included in the supermarket product location system;

b) The processor will also be programmed to match items (products) to locations when read between identical location readings. In other words, when a reader inputs a location bar code from one end of an aisle, and then reads all of the UPCs of all items in the aisle, and then reads the same location bar code at the other end of the same aisle, this tells the processor to create a matching set of pairs of products and locations for all products read between each end of that aisle. In an alternative embodiment, each type of item could be read before or after the location reading to create location data pairings.

The overall locator system may be a stand alone device, but in most embodiments would be part of an internal connected system. It could be an intranet or secured internet system, but would in many cases be a storewide system with a plurality of user locations (units, phones, or microphones, with feedback at each location). The system will include an embedded voice-driven interface for speech control of: (1) operational instructions; (2) core system locator function operations, that is, recognition of specific requests and responses thereto; and, (3) optional and default functions. In preferred embodiments, the present invention device is both operated by speech (speech or voice activated) and speech responsive (voice answers and instructions to the user from the system). Thus, the present invention device relies upon automatic speech recognition (ASR), either in place of or in addition to manual locator systems, e.g. book, list, map and computer directories. In some embodiments, user feedback features are included wherein both audio and visual feedback is given to a user in response to recognizable voice signals, while in other possible embodiments, the user may designate audio or visual.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1A:
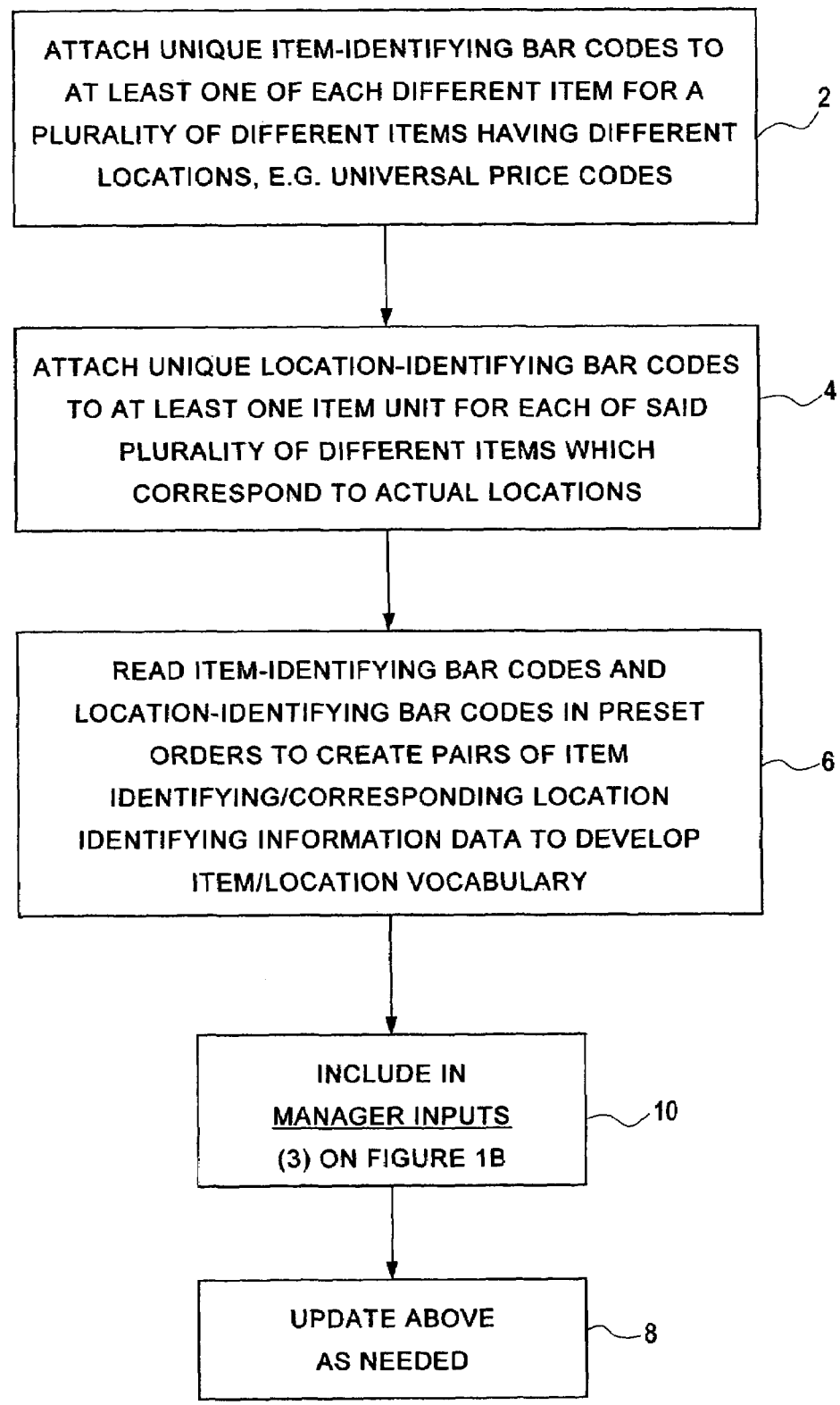
FIGS. 1a and 1b show a general schematic diagram showing software and functional features of a present invention item locator system, including the method of creating item/location data pairs.

The present invention is a voice activated/voice responsive item locator and system. By "item" is meant a place or thing that a user desires to locate. Thus, a item could be a particular brand of canned string beans, a type of outdoor stain, a booth at a convention, a particular part in inventory for sale, assemblage or distribution, a particular automobile in a production facility lot or in a large parking garage, or a room, a functional group or a person in an office building or the like. The response may be in the form of a word or sentence presented visually or audibly and it may designate an aisle, a shelf, a bin number, a rom number, a row and slot or space, etc.

The voice recognition system digitizes words spoken via a receiver (microphone) handset, headset, or built-in microphone for conversion from analog to digital utilizing a continuous speech recognition digital signal processor (DSP). The main support structure may be a conventional type housing for phones and other communications devices, may be of a different shape or configuration or may be built into a device such as a wall or desk unit, with or without monitor. It may be portable or permanently affixed and could be powered by any means available, e.g. AC or DC current. In the portable mode, the system would be wireless for the user and would, in that respect operate like a cell phone, two way radio, "walkie talkie" or other short distance wireless device, but would have a processor at a central or fixed location having the same features as described above, i.e., the DSP with programming capabilities, etc.

The DSP is connected to a programmable microprocessor and either by customized input or a standard program, the system enables the user to quickly enter voice-activated fields, e.g., such as "Where is . . . ", "Find . . . ", etc. Verification of voice recognition accuracy (prior to execution) is optional and may be accomplished via synthesized voice playback and/or a screen confirmation which requires a "YES" or "NO" to execute or open for revision. In some preferred embodiments, a screen, e.g., LCD, enables visual feedback during input phase, with support for deletion, insertion, correction, etc. Cancellation of the entire command or programming instructions may be possible at any time (prior to execution), via keystroke or voice command.

Another important aspect of the present invention is the inclusion into the system of software and hardware (equipment) to utilize a method of creating item location information for the system. It involves using item-identifying bar codes on items to be included and using location-identifying bar codes from corresponding locations. The location-identifying bar codes are physically situated on the locations themselves. For example, they are located on aisle ends, shelves, bins, drawers, floor area grids, etc.

The location-identifying bar codes may be custom created for the locations or may be established as a universal location system. Alternatively, a manager could use existing UPC bar codes for the locations, provided that they were different from the items to be located, and provided that the system were programmed to correlate these particular codes to specified locations.

The item-identifying bar codes are typically located on the items themselves, but when more than one identical item is included, a single item of the set of identical items will be sufficient for the method to work. However, it is preferred that all items in each set have the bar code located thereon. In some preferred embodiments, the bar codes for the items are Universal Price Code (UPC) bar codes, but the present invention need not be limited thereto, such as when it would be more appropriate to create unique identifying codes for each and every item, such as automobiles, artwork, etc.

The bar code includes a code for genus data and for species data. The genus data includes row or aisle data while the species data includes bin, drawer, or shelf data.

The essential features of the present invention involve the creation of a voice-based guide or locator and the creation of appropriate item/corresponding location data base, to offer enhanced convenience and speed to users for location of one or more items.

Figure 1B:
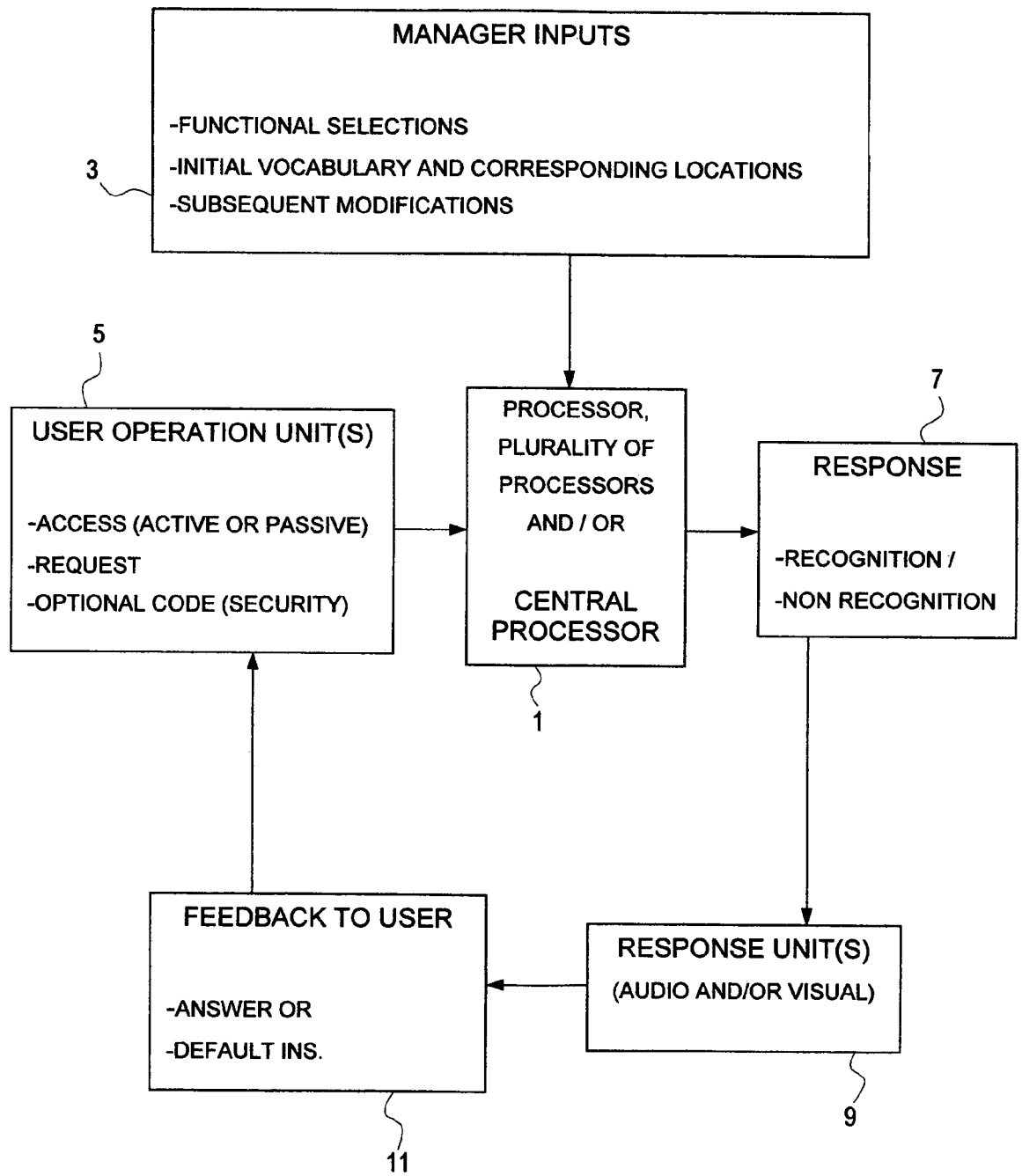

FIGS. 1a and 1b show a general schematic diagram of a present invention system showing general software features and functional features. Thus, the present invention system includes a method, software and hardware for the creation of item/location data pairs, as described above. In FIG. 1a, the basic aspects of the item/location information data creation are set forth in schematic form. The unique item-identifying bar codes are attached 2 to at least one of each different item for a plurality of sets of items, each set having items different from the items in the other sets. Likewise, unique location-identifying bar codes are attached 4 to the corresponding locations, and, subsequently, they are read 6 in predetermined manner so that the program recognizes sequences and creates data pairs to develop the item/location vocabulary for the system. This information is included in manager inputs 10 (reference also FIG. 1b). The method shown in FIG. 1a is repeated as needed for updating 8.

FIG. 1b illustrates other features of the present invention and includes a central processor 1 which may be an external or internal component, i.e., within a single unit or at a separate location from audio receivers and transmitters, e.g., microphones/speakers for user inputs and feedback to users.

The system may be preprogrammed with the user being required to follow concise instructions for activation and operation, or may be programmable to alter, add or enhance ease or methods of use, e.g. through a limited access code, for manager inputs 3 of user instructions. In any event, manager inputs 3 shall include functional selections and inputs of items and their locations, with provision for subsequent access for modifications. This programming may include direct keyboard, voice, etc., and, as mentioned, may include security capabilities for preventing unauthorized use, e.g. voice identification (user recognition) or user security code system, as well as other options which may be included therein, such as a "help" detailed manager instruction section.

Once the system has been programmed for use, the user operation unit(s) 5 provide functional access, which may be passive, i.e., the user speaks, picks up a phone, presses a button, or otherwise takes some action to activate the system; or it may be active, i.e., a proximity sensor, a periodicity timer, or other internal mechanism may automatically activate the system and could trigger an audio or visual query, such as "May I help you locate a product?"

Once the system has been activated and a user has stated the necessary words of input to activate the device, recognition/non-recognition response 7 results from processing the user inputs to central processor 1, and audio and/or video response unit(s) 9 provide feedback 11 to the user, either by answering the inquiry, conditionally defaulting, e.g., asking for a repeat or a restate the question, or fully defaulting, e.g. directing the user to a courtesy desk or check out counter for help.

Figure 2:
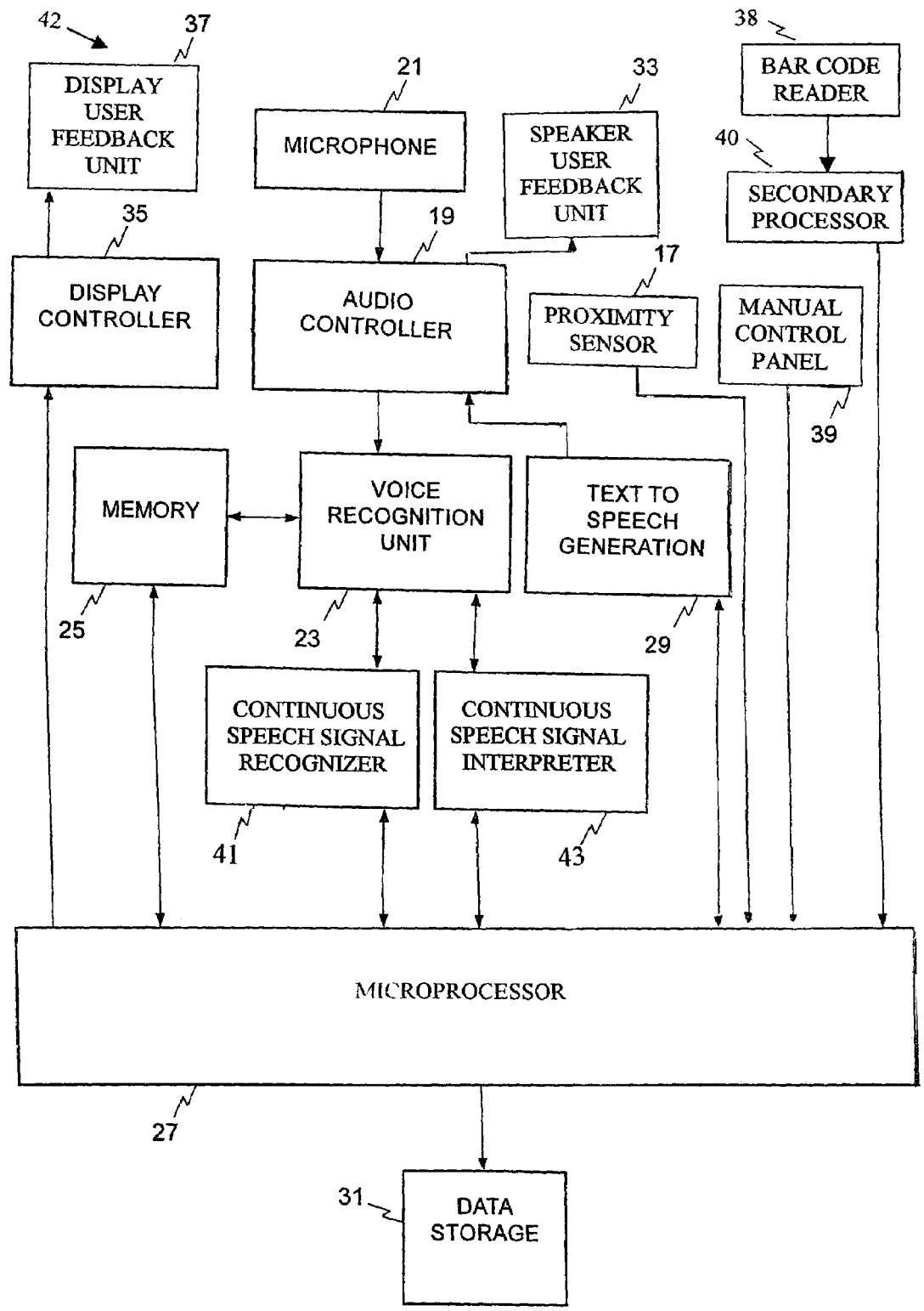
FIG. 2 shows a schematic diagram illustrating the physical functions of a present invention voice recognition item locator device after the item/location information data pairs have been created; and, FIG. 3 shows a schematic diagram of a present invention device illustrating details of a voice recognition submodule used therein.

FIG. 2 shows a schematic diagram illustrating a present invention voice activated/voice responsive item locator system, showing support structure 42 for the physical arrangement and function of components after the item/corresponding location information has been inputted. Thus, symbol 17 indicates an optional user prompter proximity sensor and symbol 21 is a microphone or equivalent component for voice input. The voice input is sent to audio controller 19 and to automatic speech recognition unit 23 and is converted from analog to digital signals. The speech recognition unit 23 communicates with a continuous speech signal recognizer 41 and a continuous speech signal interpreter 43. CPU/Memory 25 compares the digital signals to the set up or dictionary of digital words or phrases in memory. Once a match is found, the system microprocessor 27 and data storage 31 operate to respond with an answer or a default instruction or a query by providing digital text to text-to-speech generator 29, which provides audio feedback to a user via audio controller 19 and speaker user feedback unit 33. Feedback to a user may also be provided on display user feedback unit 37 via display controller 35. Manual control panel 39 is used for manager set up and modifications. Bar code reader 38 is connected to secondary processor 40 wirelessly. The secondary processor 40 communicates with the microprocessor 27. In addition, the secondary processor 40 is adapted to receive and translate bar code reader 38 inputs, and includes software to create item location information, by matching item-identification bar code readings and corresponding location-identification bar code readings.

Figure 3:
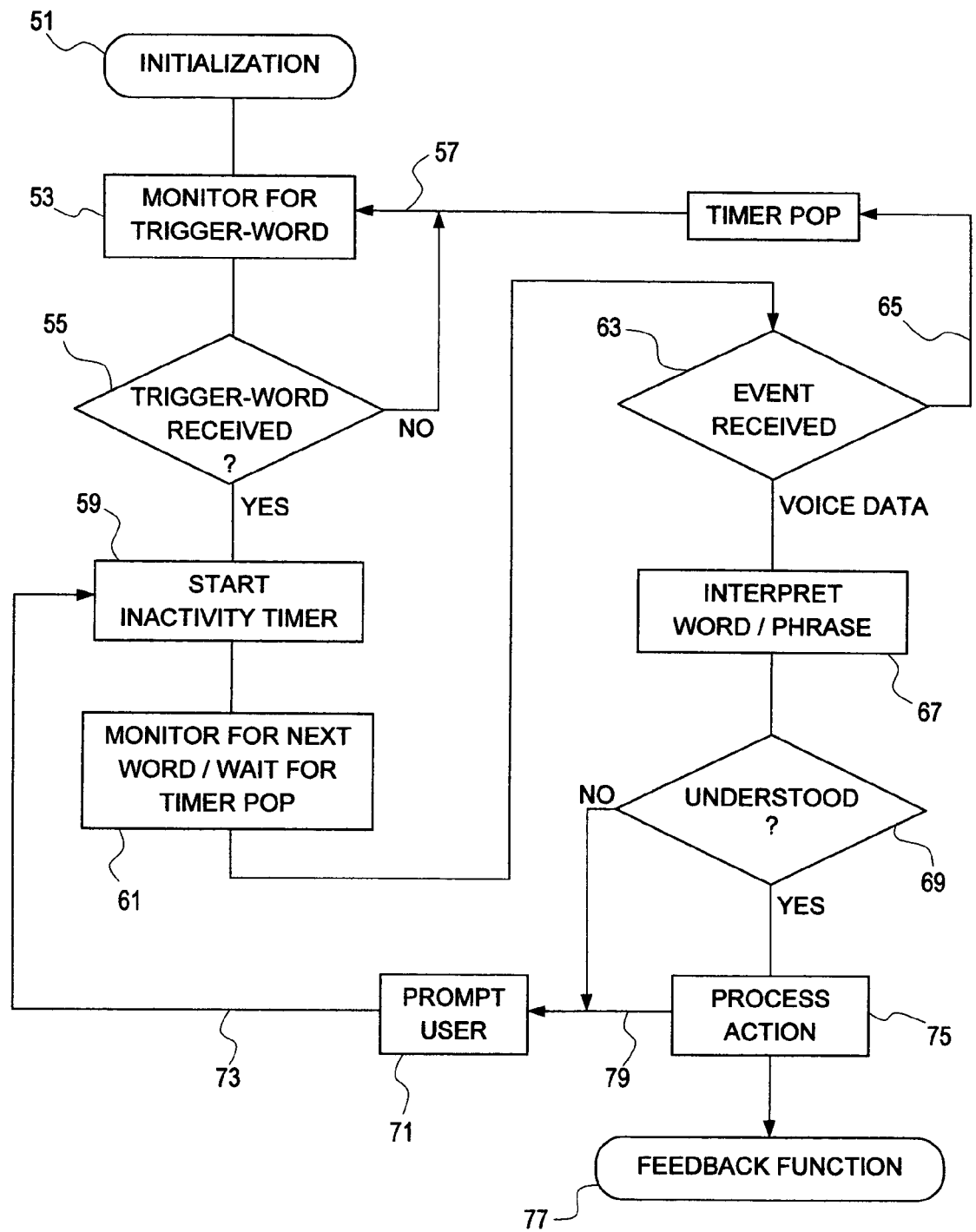

FIG. 3 shows the details of one preferred embodiment of the submodule used in the present invention device. The voice recognition component converts an acoustic signal into a sequence of labels. The system takes the raw acoustic data, and processes it through the recognizer. The recognizer then matches it against a set of models using a decoder that generates a recognition token. This token represents what the user said as either a single word or utterance. The recognizer itself does not interpret the meaning of the recognized output, that is the function of the interpreter (described later). The recognizer uses Hidden Markov Models (HMMs) to provide for a continuous speech recognition engine. HMMs do not process the acoustic signal directly but instead split the signal into a sequence of discrete observations. These observations are derived from a digital representation of the signal that had been converted from the analog signal generated by the microphone. During recognition, the likelihood of each model (or sequence of models) matching the incoming signal is calculated. The recognizer simply selects the most likely model to decode the signal. As this is done continuously, the recognizer can process speech as opposed to isolated words, allowing the user to talk more naturally.

Each acoustic model represents a short sound. The interpreter combines these sounds into words using a dictionary. This dictionary specifies the pronunciation of each word in terms of the acoustic models. After identifying the most likely word, the interpreter then joins sets of models together (using a Viterbi decoder) in a series of pre-defined connections such that paths can be established to provide for a degree of "natural language" recognition; in other words, the user can say "Find hammers", "Where are hammers" or "hammers" and they are all understood to mean the same thing. Moreover, these sets of models and dictionaries are interchangeable, allowing the same voice recognition component to be used in a variety of applications.

As the voice recognition component is running continuously, there needs to be a way to distinguish background conversations that might accidentally trigger an unwanted action by the device. For example, two people standing by a voice-activated device might be discussing locations of different goods in a supermarket and be misinterpreted or undesireably responded to. To avoid this problem, the recognition unit requires a command word to trigger before beginning further recognition. The trigger word is a user-definable setting.

Thus, in FIG. 3, initialization 51 initiates monitoring 53 for a trigger word from a user. When a word is received, it is analyzed to determine whether or not a trigger word 55 has been received. If not, signal 57 returns the status to monitoring 53 for a new word. This loop continues until a trigger word is recognized and an inactivity timer 59 is started. The monitor 61 proceeds with the monitoring for the next word and waits for timer pop 65. When an event 63 is received, timer pop 65 returns to the monitor 53 to continue the monitoring process and the voice data is sent to interpretation 67. If it is understood 69, an action 75 if process and feedback function 77 is performed. Additionally, signal 79 prompts user 71. Likewise, if the interpretation is not understood 69, user 71 is prompted and via signal 73, timer 59 begins again. These cyclings operate on a continual basis while the system is initiated. Voice activation may also be used to shut down the system.

Obviously, numerous modifications and variations of the present invention are possible in light of the above teachings. It is therefore understood that within the scope of the appended claims, the invention may be practiced otherwise than as specifically described herein.

What is claimed is:
1. An item locator system having both voice activation and voice responsive capabilities for location feedback to locate one or more specific items, which comprises:
   a.) a plurality of sets of different items, set having at least one item therein, each set having a specified location, and each set having its own unique item-identifying bar code, with at least one item of each set having said unique item-identifying bar code located thereon;
   b.) a plurality of specified locations, each location having at least one of said plurality of sets of different items located thereon, each location of said plurality of locations having a unique location identifying bar code, each of said plurality of locations having a said unique location-identifying bar code physically situated thereon;

c.) a support structure, for physically supporting said system at one or more locations, and functionally containing or connected to the following components:

d.) a continuous speech recognition digital signal processor (DSP);

e.) a programmable microprocessor interfaced with said speech recognition DSP;

f.) sufficient programming and circuitry contained within said programmable microprocessor to provide for voice activation and voice recognition and response, and having item-identification/corresponding location-identification data pairs obtained from said unique item-identifying bar codes and said unique location-identifying bar codes, so as to provide item location information to a user;

g.) voice input means connected to said speech recognition DSP;

h.) memory storage means connected to said programmable microprocessor for storage of operational inputs, control inputs, voice recognition vocabulary for storage of command match and execute functions; and i.) at least one user feedback unit and connection from said programmable microprocessor to said at least one user feedback unit, said at least one user feedback unit adapted to provide feedback selected from the group consisting of audio feedback, visual feedback and combinations thereof, to a user in response to an item location query wherein said feedback is selected from the group consisting of an answer, default instructions and combinations thereof.

2. The system of claim 1 wherein said unique item-identifying bar code is a universal price code.

3. The system of claim 1 wherein unique item-identifying bar code is a bar code which corresponds to a location selected from the group consisting of aisle, row, shelf, bin, drawer and floor space area.

4. The system of claim 1 wherein said unique item-identifying bar code is a bar code which includes code for genus data and for species data.

5. The system of claim 4 wherein said genus data is row or aisle data, and said species data is bin, drawer or shelf data.

6. The system of claim 1 which said programming includes software which is capable of receiving bar code reader inputs and converting said bar code reader inputs to item-identification/corresponding location-identification data pairs for location information.

7. The system of claim 1 wherein said user feedback unit includes visual display means for viewing visual feedback being selected from the group consisting of text, map and a combination thereof.

8. The system of claim 1 wherein said user feedback unit includes sufficient hardware and software to provide audio feedback to a user in response to recognizable speech.

9. The system of claim 1 wherein said memory storage means further includes flash ROM storage and provides for remote diagnostics and system programming.

10. The system of claim 1 wherein said voice input means includes a microphone.

11. The system of claim 1 which further includes a secured manual control panel for input and management of item and location data into said system.

12. The system of claim 11 wherein said manual control panel further contains a keypad and menu for operation and programming options, a microphone, a screen for input and feedback display.

13. The system of claim 1 in which the components further include an audio feedback component which includes audio feedback hardware and software adapter to audibly respond to recognizable voice input, including digital-to-analog conversion and an output speaker.

14. The system of claim 1 wherein said DSP includes a continuous speech recognition engine having a continuous speech signal recognizer and a continuous speech signal interpreter.

15. The system of claim 14 wherein said continuous speech recognition engine utilizes tokens of raw acoustic signals representing utterances or words and matches these against a set of models and then relies upon likelihood to select a most likely model to decode signals for interpretation.

16. The system of claim 1 which further includes at least one bar code reader connected to said microprocessor, and said connected reader is selected from being directly connected and being wirelessly connected to said microprocessor.

17. The system of claim 16 which further includes at least one bar code reader connected to said microprocessor, and said connected reader is selected from being directly connected and being wirelessly connected to said microprocessor.

18. The system of claim 1 which further includes a secondary processor being adapted to receive and translate bar code reader inputs thereto and having sufficient software to create item location information by matching item-identification bar code readings and corresponding location-identification bar code readings, and to communicate with said microprocessor.

19. The system of claim 18 which further includes at least one bar code reader connected to said secondary processor, and said connected reader is selected from being directly connected and being wirelessly connected to said secondary processor.

20. The system of claim 18 which said secondary processor is adapted to convert said item location information into continuous speech recognition digital signals.

21. A method of creating data for locating one of a plurality of items in a facility, comprising:
using a first set of bar codes to determine item identity for each of the plurality of items; and
using a second set of bar codes to determine the location of at least one of the plurality of items, wherein the second set of bar codes are physically located on portions of the facility.

22. The method of claim 21 further comprising:
reading the location data from the second set of bar codes in conjunction with the item identification data from the first set of bar codes; and
storing the location data and the item identification data for use as resource data in a memory.

23. The method of claim 22 wherein reading the location data comprises reading using a bar code reader.

24. The method of claim 21 wherein the portions of the facility comprise one or more of the following: aisle ends, shelf edges, bin walls, and parking spaces.

25. A locator system for a user to locate one of a plurality of items in a facility, comprising:
at least one processor, adapted to provide feedback to the user regarding the location of the one of the plurality of items;
a database, coupled for access by the at least one processor, storing location information for each of the plurality of items;

a bar code reader operable to use a first set of bar codes to determine item identity for each of the plurality of items, and to use a second set of bar codes to determine the location for each of the plurality of items, wherein the second set of bar codes are physically located on portions of the facility; and wherein the at least one processor is adapted to create the location information by matching the first set of bar codes with corresponding ones of the second set of bar codes.

26. The locator system of claim 25 wherein the bar code reader is operable to communicate wirelessly with the at least one processor.

27. A locator system comprising:

a local processor residing in a facility;

a database, coupled for access by the local processor, storing location information for each of a plurality of items in the facility;

an input interface, coupled to the local processor, for accepting a request by a user for the location of at least one of the plurality of items; and a controller, coupled to the local processor, operable to provide feedback to the user regarding the location of the at least one of the plurality of items, wherein the feedback is selected from the group consisting of audio feedback, visual feedback and combinations thereof, and wherein the form of the feedback is selected from the group consisting of an answer, default instructions and combinations thereof.

28. A system for creating an item location directory to locate one or more specific items, comprising:

a plurality of sets of different items, each set having at least one item therein, each set having a specified location, and each set having a unique item-identifying bar code, with at least one item of each set having said unique item-identifying bar code located thereon;

a plurality of specified locations, each location having at least one of said plurality of sets of different items located thereat, each location of said plurality of locations having one unique location-identifying bar code, each of said plurality of locations having a said unique location-identifying bar code physically situated thereon;

at least one bar code reader for reading said item-identifying bar codes and said location-identifying bar codes;

at least one processor adapted to receive inputs from said at least one bar code reader; and sufficient programming within said at least one processor to provide recognition, organization, storage and presentation of item-identification/corresponding location-identification data pairs obtained from said item-identifying bar codes and said location-identifying bar codes, so as to create an item location directory therefrom wherein said unique item-identifying bar code is a universal price code bar code.

29. The system of claim 18 wherein said unique location-identifying bar code is a bar code which corresponds to a location selected from the group consisting of aisle, row, shelf, bin, drawer and floor space area.

30. The system of claim 18 wherein said unique location-identifying bar code is a bar code which includes code for genus data and for species data.

31. The system of claim 30 wherein said genus data is row or aisle data, and said species data is bin, drawer or shelf data.

32. The system of claim 18 wherein said programming includes software which receives bar code reader inputs and converts said received inputs to item-identification/corresponding location-identification data pairs for location information.

33. The system of claim 18 wherein said system includes a user feedback unit which includes visual display means for viewing visual feedback in the form of text, or map or a combination thereof.

34. The system of claim 18 wherein said location-identifying bar codes are universal price code bar codes assigned to specific locations and are different from all item-identifying bar codes contained within the system, and wherein said processor is programmed to correlate said location-identifying bar codes in their assigned locations.

35. The system of claim 28 wherein said location-identifying bar codes are universal price code bar codes assigned to specific locations that are different from all item-identifying bar codes contained within the system, and wherein said at least one processor is programmed to correlate said location-identifying bar codes to their assigned locations.

36. The system of claim 28 which further includes at least one directory selected from the group consisting of printed directory, on-screen directory, on-line directory, audible directory and combinations thereof.

37. A method of creating data for directories for locating items, comprising:

for a plurality of different sets of items, each set's items being different from items of other sets, and each set containing at least one item, and each set having a specific location, providing a unique item-identifying bar code on at least one item of each set of items;

physically applying unique location-identifying bar codes to at least one item of each set of items, said location-identifying bar codes representing the specific location of the item to which it is applied;

reading said item-identifying bar codes and said location-identifying bar codes in a predetermined sequence to create item/corresponding location data and inputting said data to a processor for assemblage into a directory format and for storage thereof for subsequent directory retrieval; and wherein said item-identifying bar codes are universal price code bar codes.

38. The method of claim 37 wherein location-identifying bar codes are each physically applied to items to represent a specific item location selected from the group consisting of aisle, row, shelf, bin, drawer and floor space area.

39. The method of claim 37 further comprising creating said unique location-identifying bar codes prior to applying them to said items.

40. The method of claim 39 wherein said unique location-identifying bar codes are created from universal price code bar codes which are not included in the item-identifying bar codes.

41. The method of claim 37 wherein said bar codes are read with a bar code reader which is connected directly to said processor, is connected indirectly to said processor, or is connectable to said processor.

42. The method system of claim 37 wherein said bar codes are read with a bar code reader which is wirelessly connected to said processor.

43. The method of claim 37 further comprising utilizing a secondary processor, to receive and translate bar code reader inputs thereto and to create item/corresponding location information in a voice-enabling format.

44. An item locator system for locating one or more specific items, comprising:
- a plurality of sets of different items, each set having at least one item therein, each set having a specified location, and each set associated with an item-identifying bar code, with at least one item of each set having said unique item-identifying bar code located thereon;
- a plurality of specified locations, each location having at least one of said plurality of sets of different items located thereat, each location of said plurality of locations associated with a unique-location identifying bar code, each of said plurality of locations having said unique location-identifying bar code physically situated on at least one item from each set of items to be located at that location;
- a microprocessor programmed to provide voice recognition and response, and to process item-identification/corresponding location-identification data pairs obtained from said unique item-identifying bar codes and said unique location-identifying bar codes, so as to provide item location information to a user; and
- at least one user feedback unit, coupled to said microprocessor, adapted to provide feedback selected from the group consisting of audio feedback, visual feedback and combinations thereof, to a user in response to an item location query wherein said feedback is selected from the group consisting of an answer, default instructions, a query, and combinations thereof.

45. The system of claim 44 further comprising:
- memory storage coupled to said microprocessor for storage of operational inputs, control inputs, and voice recognition vocabulary for storage of command match and execute functions;
- at least one support, to physically support said system at one or more locations; and
- a continuous speech recognition digital signal processor (DSP) coupled to said microprocessor.

46. The system of claim 44 wherein said microprocessor is programmed to receive bar code reader inputs and to convert said bar code reader inputs to item-identification/corresponding location-identification data pairs for said item location information.

47. The system of claim 44 wherein said user feedback unit includes visual display means for viewing visual feedback selected from the group consisting of a text, a map and combinations thereof.

48. The system of claim 44 further comprising at least one bar code reader wirelessly coupled to said microprocessor.

49. The system of claim 44 further comprising a secondary processor, coupled to communicate with said microprocessor, adapted to receive and translate bar code reader inputs and to create said item location information by matching item-identification bar code readings and corresponding location-identification bar code readings.

50. The system of claim 49 further comprising at least one bar code reader coupled to said secondary processor.

* * * * *

UNITED STATES PATENT AND TRADEMARK OFFICE
CERTIFICATE OF CORRECTION

PATENT NO. : 7,292,678 B2  Page 1 of 1
APPLICATION NO. : 10/696660
DATED : November 6, 2007
INVENTOR(S) : Kenneth P. Glynn and Jerome R. Mahoney It is certified that error appears in the above-identified patent and that said Letters Patent is hereby corrected as shown below:

At column 10, line 56, following the word "items," add --each--.

At column 10, line 64, replace the words "location identifying" with --location-identifying--.

At column 10, line 65, replace the words "having a said" with --having said--.

At column 11, line 33, following the word "wherein" add --said--.

At column 11, line 43, following the words "claim 1" add --in--.

At column 12, line 38, following the words "claim 18" add --in--.

At column 13, line 57, replace the words "claim 18" with --claim 28--.

At column 13, line 62, replace the words "claim 18" with --claim 28--.

At column 14, line 1, replace the words "claim 18" with --claim 28--.

At column 14, line 6, replace the words "claim 18" with --claim 28--.

At column 14, line 10, replace the words "claim 18" with --claim 28--.

At column 14, line 63, delete the word "system".

Signed and Sealed this

First Day of July, 2008

JON W. DUDAS
*Director of the United States Patent and Trademark Office*